(12) United States Patent
Seeboth et al.

(10) Patent No.: US 10,133,093 B2
(45) Date of Patent: Nov. 20, 2018

(54) DOPING CAPSULES, COMPOSITE SYSTEMS COMPRISING THESE AND ALSO USE THEREOF

(71) Applicant: FRAUNHOFER-GESELLSCHAFT ZUR FÖRDERUNG DER ANGEWANDTEN FORSCHUNG E.V., München (DE)

(72) Inventors: Arno Seeboth, Berlin (DE); Olaf Mühling, Berlin (DE); Ralf Ruhmann, Berlin (DE)

(73) Assignee: Fraunhofer-Gesellschaft zur förderung der angewandten Forschung e.V., München (DE)

( * ) Notice: Subject to any disclaimer, the term of this patent is extended or adjusted under 35 U.S.C. 154(b) by 48 days.

(21) Appl. No.: 15/080,312

(22) Filed: Mar. 24, 2016

(65) Prior Publication Data

US 2016/0202500 A1    Jul. 14, 2016

Related U.S. Application Data

(62) Division of application No. 12/735,162, filed as application No. PCT/EP2008/010633 on Dec. 15, 2008, now abandoned.

(30) Foreign Application Priority Data

Dec. 20, 2007    (DE) .................... 10 2007 061 513

(51) Int. Cl.
*G02F 1/00*    (2006.01)
*G02F 1/01*    (2006.01)
(Continued)

(52) U.S. Cl.
CPC .............. *G02F 1/009* (2013.01); *B01J 13/02* (2013.01); *G02F 1/0054* (2013.01);
(Continued)

(58) Field of Classification Search
CPC .... B01J 13/185; E04C 2/043; Y10T 428/2984
See application file for complete search history.

(56) References Cited

U.S. PATENT DOCUMENTS 3,423,489 A    1/1969    Arens et al.
3,787,327 A    1/1974    Emrick
(Continued)

FOREIGN PATENT DOCUMENTS

DE    133004 A1    11/1978
DE    35 23 661 A1    1/1987
(Continued)

OTHER PUBLICATIONS

Bamfield, "Chromic Phenomena," *The Royal Society of Chemistry*, pp. 33-41 (2001).
(Continued)

*Primary Examiner* — Shuangyi Abu Ali
(74) *Attorney, Agent, or Firm* — Leydig, Voit & Mayer, Ltd.

(57) ABSTRACT

The invention relates to doping capsules which have a substance which displays a decreasing transparency with increasing temperature within a defined temperature range due to physicochemical interactions with the polymer matrix to be doped. Likewise, the invention relates to composite systems which have a polymer matrix doped with the doping capsules. The capsules according to the invention are used for sun protection or heat reflection.

19 Claims, 1 Drawing Sheet

(51) Int. Cl.
*B01J 13/02* (2006.01)
*C08K 7/16* (2006.01)

(52) U.S. Cl.
CPC .............. *G02F 1/0147* (2013.01); *C08K 7/16* (2013.01); *Y10T 428/2982* (2015.01)

(56) References Cited

U.S. PATENT DOCUMENTS

| | | | |
|---|---|---|---|
| 3,915,916 | A | 10/1975 | Leverett |
| 4,028,118 | A | 6/1977 | Nakasuji et al. |
| 4,121,010 | A | 10/1978 | Lasky et al. |
| 4,307,942 | A | 12/1981 | Chahroudi |
| 4,421,560 | A | 12/1983 | Kito et al. |
| 5,178,990 | A | 1/1993 | Sataka et al. |
| 5,318,939 | A | 1/1994 | Laver et al. |
| 5,300,558 | A | 4/1994 | Kurisu et al. |
| 5,456,852 | A * | 10/1995 | Isiguro ............... B01J 13/02 165/10 |
| 5,527,385 | A | 6/1996 | Sumii et al. |
| 5,849,651 | A | 12/1998 | Takayama et al. |
| 5,879,443 | A | 3/1999 | Senga et al. |
| 5,928,988 | A | 7/1999 | Yamane et al. |
| 6,057,466 | A | 5/2000 | Starzewski et al. |
| 6,200,681 | B1 * | 3/2001 | Jahns ............... B01J 13/14 428/402.21 |
| 6,262,833 | B1 | 7/2001 | Loxley et al. |
| 6,440,592 | B1 | 8/2002 | Meyer et al. |
| 6,489,377 | B1 | 12/2002 | Bicer et al. |
| 6,670,436 | B2 | 12/2003 | Burgath et al. |
| 6,706,218 | B2 | 3/2004 | Lucht et al. |
| 7,662,466 | B2 | 2/2010 | Seeboth et al. |
| 8,303,857 | B2 | 11/2012 | Seeboth et al. |
| 9,193,863 | B2 | 11/2015 | Lötzsch et al. |
| 2002/0037421 | A1 | 3/2002 | Arnaud et al. |
| 2002/0065401 | A1 | 5/2002 | Feiler et al. |
| 2002/0086443 | A1 | 7/2002 | Bamdad |
| 2003/0109910 | A1 | 6/2003 | Lachenbruch et al. |
| 2004/0043078 | A1 | 3/2004 | Herault |
| 2005/0147825 | A1 | 7/2005 | Arnaud et al. |
| 2005/0227047 | A1 | 10/2005 | Sutter et al. |
| 2006/0166822 | A1 | 7/2006 | Senga et al. |
| 2006/0189737 | A1 | 8/2006 | Pieslak et al. |
| 2006/0246292 | A1 | 11/2006 | Seeboth et al. |
| 2010/0181541 | A1 | 7/2010 | Seeboth et al. |

FOREIGN PATENT DOCUMENTS

| | | |
|---|---|---|
| DE | 40 25 796 A1 | 2/1991 |
| DE | 196 42 886 A1 | 4/1998 |
| DE | 696 21 627 T2 | 2/2003 |
| DE | 103 12 464 A1 | 9/2004 |
| DE | 103 39 442 A1 | 3/2005 |
| DE | 10 2007 017 791 A1 | 10/2008 |
| EP | 0 477 140 A2 | 3/1992 |
| EP | 0 524 692 A1 | 1/1993 |
| EP | 0 677 564 A2 | 10/1995 |
| EP | 1 084 860 A2 | 3/2001 |
| EP | 1 084 860 B1 | 3/2001 |
| EP | 1 157 802 A2 | 11/2001 |
| EP | 1 211 300 A2 | 6/2002 |
| EP | 1 258 504 A1 | 11/2002 |
| EP | 1 323 540 A2 | 7/2003 |
| EP | 1 387 995 B1 | 2/2006 |
| JP | H03-290467 A | 12/1991 |
| JP | H05-116452 A | 5/1993 |
| JP | H08-127181 A | 5/1996 |
| JP | 9-235545 A | 9/1997 |
| JP | 2000-027081 A | 1/2000 |
| JP | 2004-027047 A | 1/2004 |
| JP | 2005-349367 A | 12/2005 |
| JP | 2007-099941 A | 4/2007 |
| KR | 10-2003-016589 A | 3/2003 |
| WO | WO 93/15625 A1 | 8/1993 |
| WO | WO 94/02257 A1 | 2/1994 |
| WO | WO 97/11830 A1 | 3/1997 |
| WO | WO 99/64488 A1 | 12/1999 |
| WO | WO 02/08821 A1 | 1/2002 |
| WO | WO 03/089227 A1 | 10/2003 |
| WO | WO 2005/021627 A1 | 3/2005 |
| WO | WO 2005/032838 A1 | 4/2005 |
| WO | WO 2005/077665 A1 | 8/2005 |

OTHER PUBLICATIONS

Loxley et al., "Preparation of Poly(methylmethacrylate) Microcapsules with Liquid Cores," *Journal of Colloid and Interface Science*, vol. 28, pp. 49-62 (1998).
Seeboth et al., "Thermochromic Polymers," *Encyclopaedia of Polymer Science and Technology*, Herman F. Mark, Ed., John Wiley & Sons, New York, NY, 20:11, pp. 1-23 (2003).
Seeboth et al., "Thermochromic Polymers," *Encyclopedia of Polymer Science and Technology, 3rd Edition*, Herman F. Mark, Ed., John Wiley & Sons, New York, NY, vol. 12, pp. 143-165 (2004).
Sirota et al., "Phase transitions among the rotator phases of the normal alkanes," *J. Chem. Phys.*, vol. 101, No. 12, pp. 10873-10882 (1994).
Seeboth et al., "Thermochromic Polymer Materials," *Chinese Journal of Polymer Science*, vol. 25, No. 2, pp. 123-135 (2007).
Seeboth et al., "Thermochromic Polyolefin Foils," *Journal of Applied Science*, vol. 96, pp. 1789-1792 (2005).
European Patent Office, International Search Report in International Application No. PCT/EP2008/010633 (dated Jun. 25, 2009).
European Patent Office, International Preliminary Report on Patentability in International Application No. PCT/EP2008/010633 (dated Aug. 31, 2010).
State Intellectual Property Office of the People's Republic of China, Notification of the First Office Action in Chinese Patent Application No. 200880121927.3 (dated Mar. 23, 2012).
European Patent Office, Office Action in European Patent Application No. 08 865 468.6 (dated Jan. 11, 2011).
European Patent Office, Office Action in European Patent Application No. 08 865 468.6 (dated Dec. 21, 2012).
Japanese Patent Office, Notification of Reasons for Refusal in Japanese Patent Application No. 2010-538426 (dated Nov. 13, 2012).
Japanese Patent Office, Decision of Final Rejection in Japanese Patent Application No. 2010-538426 (dated Apr. 9, 2013).
Indian Patent Office, First Examination Report in Indian Patent Application No. 4942/DELNP/2010 (dated Jan. 30, 2015).

\* cited by examiner

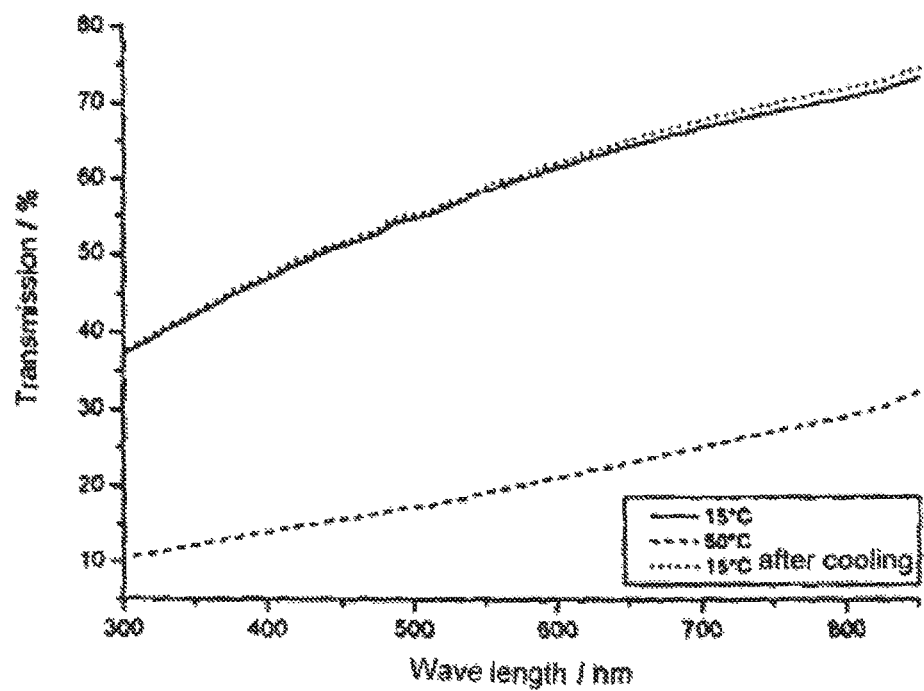

DOPING CAPSULES, COMPOSITE SYSTEMS COMPRISING THESE AND ALSO USE THEREOF

CROSS-REFERENCE TO RELATED APPLICATIONS

This application is divisional of co-pending U.S. application Ser. No. 12/735,162 filed on Apr. 13, 2011, which is a U.S. national phase of International Application No. PCT/EP2008/010633, filed on Dec. 15, 2008, which claims priority to DE 10 2007 061 513.4 filed Dec. 20, 2007, the disclosures of which are hereby incorporated by reference in their entireties and for all purposes.

SUMMARY OF THE INVENTION

The invention relates to doping capsules which have a substance which displays a decreasing transparency with increasing temperature within a defined temperature range due to physicochemical interactions with the polymer matrix to be doped. Likewise, the invention relates to composite systems which have a polymer matrix doped with the doping capsules. The capsules according to the invention are used for sun protection or heat reflection.

BACKGROUND OF THE INVENTION

Worldwide, the annual energy consumption in buildings for cooling already almost exceeds the adequate energy consumption for heating thereof. Optimisation of the energy balance is required in order to avoid increasing thermal stress in towns. Buildings must be planned accordingly such that passive cooling is effected instead of equipping them with electrical air-conditioning units.

Protection from overheating is still effected almost exclusively via conventional mechanical shading.

Recent methods, such as active switching (above all by means of electrochromism) have not proved to be successful to date. In addition to economic aspects, still unresolved technological questions are most certainly responsible for this. In *Encyclopedia of Polymer Sciences and Technology* by A. Seeboth/D. Lötzsch (2004), the use of thermochromic materials for temperature-controlled optical effects is described in detail.

Attempts have been made for decades to use thermotropic hydrogels or polymer blends for sun protection. Between 1950 and 1960, experiments were already performed in Munich zoo with thermotropic materials for sun protection. Further thermotropic materials which switch as a function of temperature or layers which permanently reflect solar radiation in the field of sun protection are known from U.S. Pat. No. 4,307,942, U.S. Pat. No. 6,440,592 and US 2005/147825.

In addition to previously unresolved technological questions, reaction mechanisms in the thermotropic systems which are used, inter alia chemical competing reactions, phase separations, phase transitions, which have certainly also not been understood up to the present, are a substantial reason for delays in introduction onto the market. Thus for example in EP 0 125 804, an aliphatic compound of the general formula $C_nH_{n+2}$ with $n=5$ to 30 is introduced as thermotropic monomers in a concentration between 0.5 and 10% by weight into a photohardening matrix polymer. Structures of this general formula are however not able to function as monomers in a polymer reaction. Monomers or monomeric compounds are, by definition, low-molecular, reactive molecules which can amalgamate to form molecular chains or networks, to form unbranched or branched polymers. Furthermore, a migration process of the homogeneously distributed aliphatic compound in the polymer matrix to the substrate surface is necessary, in particular also promoted by thermal stress. The thermotropic properties, based on the necessity for an anisotropic phase and produced in a concentration range up to 10% by weight have no long-term stability. It is furthermore described in EP 0 125 804 that the mixture must have a corresponding solubility for the thermotropic component in order to make possible a precipitation reaction. The dissolving of the thermotropic phase necessarily leads to the loss of the anisotropy which is based on intermolecular interactions of the individual thermotropic molecules amongst each other. In the subsequent crosslinking, caused kinetically and thermodynamically, the thermotropic component cannot be precipitated again quantitatively as a separate phase. Furthermore, hardening of the polymer matrix by exposure to light under an inert atmosphere or the production of films by casting between two glass plates and subsequent removal thereof does not permit continuous and cost-effective technology. This solution strategy is therefore not marketable.

The object underlying the invention, starting from the described disadvantages of the state of the art, is therefore to provide a thermotropic plastic material which has long-term stability, i.e. is thermodynamically stable, and can be used inter alia for sun protection.

This object is achieved by the features of the doping capsules and the composite system described herein, and the advantageous developments thereof. Uses according to the invention are also described.

BRIEF DESCRIPTION OF THE DRAWINGS

FIG. 1 is a graph plotting transmission (%) (Y-axis) vs. wave length (nm) (X-axis) at three different temperature regimes for an extruded thermotropic film, as set forth in Example 1.

DETAILED DESCRIPTION OF THE INVENTION

According to the invention, doping capsules comprising at least one substance which has a rotator phase in a temperature range of 10 to 55° C. is provided. The capsules thereby display a decrease in transparency in the mentioned temperature range with increasing temperature.

There should be understood by transparency, within the scope of the present invention, that a material has transparent properties when it has, in the wavelength range of UV-Vis, NIR or IR, a transmission of at least 30%, preferably at least 50% and particularly preferred at least 70%.

The rotator phase, as a function of the temperature, leads to differently ordered and isotropic phases of the core material. The plastic crystalline phase which is formed between highly-ordered crystalline phases and the completely configured isotropic phase is termed rotator phase. Reference is made, with respect to the rotator phase, to Sirota, Singer, J. Chem. Phys. 101 (1994), 10873.

The temperature-induced structural changes in the substance with the rotator phase take place between the transition from solid/solid to solid/liquid state.

These can be characterised very precisely by means of dynamic differential scanning calorimetry (DSC) and X-ray analysis. As a result of physicochemical interaction between the substance in the capsule and a polymer matrix to be doped, a temperature-dependent change in the refractive index is effected with variation of the temperature. As a result, accompanying a temperature increase, there is according to the invention a reduction in transparency at the same time, which represents a substantial difference and advantage relative to the systems known from prior art. This effect can be used inter alia for sun protection. It is a prerequisite thereby that the substance with the rotator phase is present as separate phase. This must be as small as possible in the spatial dimension in order to satisfy the optical requirements and be present as far as possible in monodisperse form in order to take into account the mechanical properties of the resulting thermotropic total system.

Preferably, the at least one substance with a rotator phase is selected from the group of saturated and unsaturated hydrocarbons. Substances from the following group are hereby particularly preferred:

saturated or unsaturated aliphatic hydrocarbons ($C_{10}$-$C_{30}$), in particular n-tetradecane, n-eicosane, n-nonadecane, n-heptacosane or hexadecane, saturated or unsaturated fatty alcohols and fatty amines, in particular dodecyl alcohol, decyl alcohol, hexadecyl alcohol, dodecylamine, decylamine or hexadecylamine, esters of fatty acids and halogenated hydrocarbons, in particular $C_{14}$-$C_{26}$ fatty acid esters, $C_{14}$-$C_{26}$ hydrocarbons or perfluoroalkanes, cholesteryl compounds, in particular cholesterol monohydrate, cholesteryl acetate or stigmasterol, polyolefins, in particular polyethylene, polypropylene or copolymers thereof, organometals, in particular octamethyl ferrocenes, and also mixtures hereof.

The use of the substance with rotator phase can be effected as single substance or as a mixture of a plurality of substances in one capsule.

The doping capsule can likewise comprise substances which have no rotator phase. There are suitable here in particular surface-active substances, such as non-ionic ethylene oxide derivatives which can increase the interaction between the substances with rotator phase by formation of a thermodynamically stable complex. In particular when using paraffin as substance with rotator phase, preferably anionic or cationic surface-active substances can be used, such as sodium dodecyl sulphate (SDS) or cetyltrimethyl ammonium bromide (CTAB) as additives. The possibility of forming the rotator phases by complex formation of substances with rotator phases and substances without rotator phases is not precluded and can be used as effect.

The capsules according to the invention are preferably microcapsules and have a diameter in the range of 1 to 10 μm. However the capsules can also be produced as nanocapsules and thereby have preferably a diameter in the range of 10 nm to 1 μm. The only condition here is that the nanocapsules have a diameter above λ/4. In the case of low demands on the optical quality, e.g. if there are no high requirements made upon a homogeneous appearance, the capsules can even have a diameter of more than 10 μm.

When used for sun protection, also mixtures of capsules with different substances with a rotator phase or even capsules of a different size can be used. As a result, the working range can be varied virtually arbitrarily.

The capsules according to the invention can be produced according to the instructions of A. Loxley and B. Vincent, Journal of Colloid and Interface Science 208, 49-62 (1998). Separation of the capsules is effected by filtration or spray-drying.

The specific technique and the conditions in the starter emulsion are responsible for the capsule size. These can be above or below 1 jam, i.e. in the micro- or nano-range.

The switching temperature between the transparent and opaque state for the capsule-doped polymer material, i.e. the composite system, is determined by the respectively used substance with rotator phase or mixture thereof. As a result, outstanding diversity is produced. For nanocapsules (below 1 μm) there result, by using different droplet sizes with a constant rotator substance, even additional variation possibilities for influencing the switching point. Thus a mixture of capsules with a constant rotator substance C20 can be used, the capsule size being approx. 130 nm or approx. 300 nm. Of course, micro- and nanocapsules can likewise be used as a mixture, the rotator substance being able to be constant or different, consisting respectively of a single component or a mixture.

The doping capsules can be introduced with different agitation techniques (blade agitator, dissolver, Turrax) into the monomeric starting compounds for cast resin systems or for duromers. The concentration in % by weight is between 0.1 and 8.5% by weight, in particular between 0.5 and 2.5% by weight. If the capsules are supplied as powder or a pre-manufactured batch of thermoplastic polymer materials to an extrusion process, the concentration here should be between 0.5 and 7.5% by weight. In the case of extrusion processes, melamine resin- and crosslinked polymethacrylate capsules, preferably for polyolefins, should be used. Epoxy resin capsules are doped preferably in higher-melting polymers, such as PC, PS or PMMA.

According to the invention, composite systems are likewise provided, which comprise at least one polymer matrix and also the above-described capsules according to the invention. There are possible thereby as polymer matrix, preferably thermoplastics, duromers, elastomers, cast resins, lacquers, hydrogels, inorganic polymers and mixtures hereof. It is hereby essential that the mentioned polymer matrices have at least one transparent state within a defined temperature or pressure range.

There are particularly suitable as thermoplastics, polyolefins, polycarbonates, polymethacrylates, polyamides, blends thereof, copolymers and polymer alloys. Melamine resins and epoxy resins are preferred duromers and organic silicon derivatives for lacquers. Elastomers should preferably be crosslinked by means of sulphur. In addition to the selection of plastic material class, also the technological processing thereof is crucial for the macroscopic properties.

The doping capsules according to the invention are used in particular in the field of sun protection and heat reflection.

The subject according to the invention is intended to be explained in more detail with reference to the subsequent example and the associated FIGURE without wishing to restrict said subject to the special embodiment shown here.

Example 1

3.5% by weight of a microcapsule with a capsule size of 3 to 6 μm is mixed into polyethylene of type LD. In an extrusion process, a thermotropic film with a layer thickness of approx. 110 μm is produced. The heating zones of the extruder are switched between 180° C. and 205° C.; at the slot die, the temperature is 210° C. The film is cooled on the chill roll to 45° C. within 2 to 5 seconds. The extruded thermotropic film increases its transparency with temperature increase (FIG. 1). The process is reversible. The film is suitable for sun protection.

The invention claimed is:

1. A method for sun protection and/or heat reflection comprising utilizing a composite comprising at least one polymer matrix and doping capsules comprising at least one substance which has a rotator phase in a temperature range of 10 to 55° C., wherein the doping capsules are present in a range of from 0.1 wt. % to 8.5 wt. % of the composite, the capsules displaying a decrease in transparency in the temperature range with increasing temperature wherein the at least one substance is present as a separate phase and in monodisperse form, and the composite has a UV-Vis. NIR or IR wavelength transmission of at least 30%, and, wherein the at least one substance is selected from the group consisting of
saturated or unsaturated aliphatic hydrocarbons ($C_{10}$-$C_{30}$),
saturated or unsaturated fatty alcohols and fatty amines,
esters of fatty acids and halogenated hydrocarbons,
cholesteryl compounds,
polyolefins,
organometals,
and mixture thereof.

2. The method according to claim 1, wherein the at least one substance has a rotator phase in the temperature range of 15 to 45° C.

3. The method according to claim 1, wherein a plastic crystalline phase is formed in the temperature range.

4. The method according to claim 1, wherein the at least one substance is selected from the group of saturated or unsaturated hydrocarbons.

5. The method according to claim 1, wherein the capsule comprises in addition substances without a rotator phase.

6. The method according to claim 1, wherein the capsules are microcapsules and have a diameter in the range of 1 to 10 μm.

7. The method according to claim 1, wherein the capsules are nanocapsules and have a diameter in the range of 10 nm to 1 μm.

8. The method according to claim 1, wherein the capsules consist of a mixture of microcapsules and nanocapsules.

9. The method according to claim 1, wherein the at least one substance comprises saturated or unsaturated aliphatic hydrocarbons ($C_{10}$-$C_{30}$) comprising n-tetradecane, n-eicosane, n-nonadecane, n-heptacosane, hexadecane or any combination thereof.

10. The method according to claim 1, wherein the at least one substance comprises saturated or unsaturated fatty alcohol and/or fatty amine comprising dodecyl alcohol, decyl alcohol, hexadecyl alcohol, dodecylamine, decylamine, hexadecylamine, or any combination thereof.

11. The method according to claim 1, wherein the at least one substance comprises esters of fatty acids and/or halogenated hydrocarbon comprising $C_{14}$-$C_{26}$ fatty acid esters, $C_{14}$-$C_{26}$ hydrocarbons, perfluoroalkanes, or any combination thereof.

12. The method according to claim 1, wherein the at least one substance comprises cholesteryl compound comprising cholesterol monohydrate, cholesteryl acetate, stigmasterol or any combination thereof.

13. The method according to claim 1, wherein the at least one substance comprises polyolefin comprising polyethylene, polypropylene, copolymers thereof, or any combination thereof.

14. The method according to claim 1, wherein the at least one substance comprises organometal comprising octamethyl ferrocene.

15. The method according to claim 1, wherein the doping capsules are present in a range of from 0.5 wt. % to 2.5 wt. % of the composite.

16. The method according to claim 1, wherein the composite has a UV-Vis, NIR, or IR wavelength transmission of at least 50%.

17. The method according to claim 1, wherein the composite has a UV-Vis, NIR, or IR wavelength transmission of at least 70%.

18. The method according to claim 1, wherein the at least one polymer matrix is selected from the group consisting of thermoplastics, duromers, elastomers, cast resins, lacquers, hydrogels, inorganic polymers, and mixtures thereof.

19. The method according to claim 1, wherein the at least one polymer matrix is polyethylene.

* * * * *